United States Patent
Ackermann et al.

(10) Patent No.: US 9,906,160 B2
(45) Date of Patent: Feb. 27, 2018

(54) METHOD FOR DISCHARGING AN INTERMEDIATE CIRCUIT CAPACITOR OF AN INTERMEDIATE VOLTAGE CIRCUIT CONVERTER

(75) Inventors: Markus Ackermann, Forchheim (DE); Gerald Amler, Nürnberg (DE); Andreas Nagel, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1400 days.

(21) Appl. No.: 13/390,867

(22) PCT Filed: Aug. 13, 2010

(86) PCT No.: PCT/EP2010/061816
§ 371 (c)(1),
(2), (4) Date: Feb. 16, 2012

(87) PCT Pub. No.: WO2011/020786
PCT Pub. Date: Feb. 24, 2011

(65) Prior Publication Data
US 2012/0146592 A1    Jun. 14, 2012

(30) Foreign Application Priority Data

Aug. 17, 2009   (DE) .................. 10 2009 037 723

(51) Int. Cl.
*H02J 7/00* (2006.01)
*H02M 7/12* (2006.01)
(Continued)

(52) U.S. Cl.
CPC ............. *H02M 7/125* (2013.01); *H02M 1/36* (2013.01); *H02M 2001/322* (2013.01)

(58) Field of Classification Search
CPC ...................................................... H02J 7/345
(Continued)

(56) References Cited

U.S. PATENT DOCUMENTS 5,943,223 A   8/1999  Pond
6,069,811 A   5/2000  Moriguchi
(Continued)

FOREIGN PATENT DOCUMENTS

DE        19735867 A1    2/1998
DE   10 2004 057 693 A1   6/2006
(Continued)

*Primary Examiner* — Yalkew Fantu
(74) *Attorney, Agent, or Firm* — Henry M. Feiereisen LLC

(57) ABSTRACT

A method for discharging an intermediate circuit capacitor of an intermediate voltage circuit converter with an electronic power converter is disclosed, wherein a main switch arranged between an AC power supply network and a primary winding of a transformer is opened and a line contactor connected between a first terminal of a secondary winding of the transformer and a first AC voltage-side connection of the electronic power converter is closed. A second terminal of the secondary winding of the transformer is connected to a second AC voltage-side connection of the electronic power converter. A pre-charging contactor connected in series with a pre-charging resistor is connected in parallel with the line contactor. Two switchable power semiconductors of the electronic power converter, which are located diagonally opposite each other in different branches of the electronic power converter, are switched on.

2 Claims, 1 Drawing Sheet

(51) Int. Cl.
*H02M 1/36* (2007.01)
*H02M 1/32* (2007.01)

(58) Field of Classification Search
USPC .............................................. 320/166; 363/37
See application file for complete search history.

(56) References Cited

U.S. PATENT DOCUMENTS

| | | |
|---|---|---|
| 7,009,853 B2 * | 3/2006 | Nagel et al. .................... 363/17 |
| 8,063,612 B2 | 11/2011 | Amler |
| 2004/0160792 A1 * | 8/2004 | Youm et al. .................... 363/37 |
| 2005/0231172 A1 | 10/2005 | Mitsuaki |
| 2008/0278969 A1 * | 11/2008 | Bolz et al. ...................... 363/17 |
| 2009/0152950 A1 | 6/2009 | Baoguo |
| 2011/0006726 A1 | 1/2011 | Dittmer et al. |

FOREIGN PATENT DOCUMENTS

| | | | |
|---|---|---|---|
| DE | 102007047713 A1 | 4/2009 | |
| JP | 2007209114 A | 8/2007 | |
| RU | 2 009 608 C1 | 3/1994 | |
| WO | WO 2006121144 A1 | 11/2006 | |
| WO | WO 2010022765 A1 * | 3/2010 | ............. H02M 1/36 |

* cited by examiner

METHOD FOR DISCHARGING AN INTERMEDIATE CIRCUIT CAPACITOR OF AN INTERMEDIATE VOLTAGE CIRCUIT CONVERTER

CROSS-REFERENCES TO RELATED APPLICATIONS

This application is the U.S. National Stage of International Application No. PCT/EP2010/061816, filed Aug. 13, 2010, which designated the United States and has been published as International Publication No. WO 2011/020786 and which claims the priority of German Patent Application, Serial No. 10 2009 037 723.9, filed Aug. 17, 2009, pursuant to 35 U.S.C. 119(a)-(d).

BACKGROUND OF THE INVENTION

The invention relates to a method for discharging an intermediate circuit capacitor of an intermediate voltage circuit converter, the electronic power converter on the line side of which has power semiconductors that can be disconnected and which is able to be connected to an AC supply network by means of a series circuit able to be bypassed by means of a line contactor comprising a charging contactor and a pre-charging resistor, a transformer and a main switch.

With intermediate voltage circuit converters a pre-charging circuit is generally present. The intermediate circuit capacitor is charged with this pre-charging circuit. The charge current is set by selecting the pre-charging resistor. The charge current may not exceed a maximum diode current of the inverse diode of the switchable power semiconductor of the power converter on the line side. If no pre-charging resistor were present a charging current would be set which would exceed the maximum current carrying capability of the line-side diodes. This would result in the destruction of these diodes. As soon as for example 80% of the maximum charge state of the intermediate circuit capacitor is reached, the pre-charging resistor is bypassed by means of a line contactor. This connects the line-side converter by means of a mains transformer to an AC power supply network.

For maintenance purposes or to rectify errors it must be ensured that the intermediate circuit capacitor is discharged within a relatively short time after the intermediate voltage circuit converter has been switched off. At least the voltage dropping at the intermediate circuit capacitor should not be greater than 60V DC. This means that dangerous currents cannot flow through the bodies of maintenance personnel coming into contact with this DC voltage.

In commercially available voltage intermediate voltage circuit converters the intermediate circuit capacitor is discharged by means of a switchable resistor. This resistor is switched electrically in parallel to the intermediate circuit capacitor. Additional components such as a contactor or a switchable power semiconductor and a resistor are thus needed for the discharging.

A method is known from DE 10 2007 047 713 A1 for discharging a high-voltage network which uses the available pre-charging resistor for this purpose. The circuit, which has a DC voltage capacitor, is a high-voltage network present in a hybrid vehicle. In the simplest case this high-voltage network consists of a battery, a power converter with DC voltage capacitor, one or more electrical machines, further high-voltage loads and a cable loom, which connects all high-voltage components to each other electrically-conductively. The high-voltage battery is able to be connected to a positive pole of the DC voltage capacitor by means of a bridgeable series circuit comprising a pre-charging resistor and a switch. The negative pole of the DC voltage capacitor is also able to be connected by means of a further switch directly to a negative pole of the high-voltage battery. For the discharging process a discharging contactor is used, which likewise has a simple closing contact or switch. The discharging contactor is connected to the pre-charging resistor such that, with closed contacts of the discharging contactor, the pre-charging resistor is connected electrically in parallel to the DC voltage capacitor.

Through this measure the known discharging circuit is restricted to a contactor, since the pre-charging resistor is not just used for charging purposes but also for discharging purposes. Through the dimensioning of the pre-charging resistor a discharging of the DC voltage capacitor is achieved far more quickly than with a separate discharging circuit. Although the outlay of the discharging circuit has been very much reduced, an additional component, namely a contactor, is still needed, which demands corresponding space and must be connected to the circuit which features a DC voltage capacitor.

The object of the invention is now to specify a method with which an intermediate circuit capacitor of a voltage intermediate circuit converter described above can be discharged.

SUMMARY OF THE INVENTION

This object is achieved in accordance with the invention with a method for discharging an intermediate circuit capacitor of an intermediate voltage circuit converter with an electronic power converter, wherein method includes the steps of opening a main switch arranged between an AC power supply network and a primary winding of a transformer, opening a line contactor connected between a first terminal of a secondary winding of the transformer and an first AC voltage-side connection in a first branch of the electronic power converter, with a second terminal of the secondary winding of the transformer being connected to a second AC voltage-side connection in a second branch of the electronic power converter, closing a pre-charging contactor, which is connected in series with a pre-charging resistor, with the series connection of pre-charging contactor and pre-charging resistor being connected in parallel with the line contactor, and switching on two switchable power semiconductors of the electronic power converter, which are located diagonally opposite each other in different branches of the electronic power converter.

Because a main switch and a line contactor are opened, with at the same time the available pre-charging contactor and two diagonally opposite switchable power semiconductors of the electronic power converter on the line side being switched on, the pre-charging resistor is connected electrically in parallel to the intermediate circuit capacitor. This means that the pre-charging resistor is also used in the discharging of the intermediate circuit capacitor of an intermediate voltage circuit converter without an additional contact or switch having to be provided. I.e. the available components are used in the discharging of the intermediate circuit capacitor of an intermediate voltage circuit converter described at the start.

BRIEF DESCRIPTION OF THE DRAWING

For further explanation of the invention the reader is referred to the drawing, in which two embodiments of an intermediate voltage circuit converter are shown in a schematic diagram.

FIG. 1 shows a single-phase supply with transformer of an intermediate voltage circuit converter, while

DETAILED DESCRIPTION OF PREFERRED EMBODIMENTS

Figure 1:
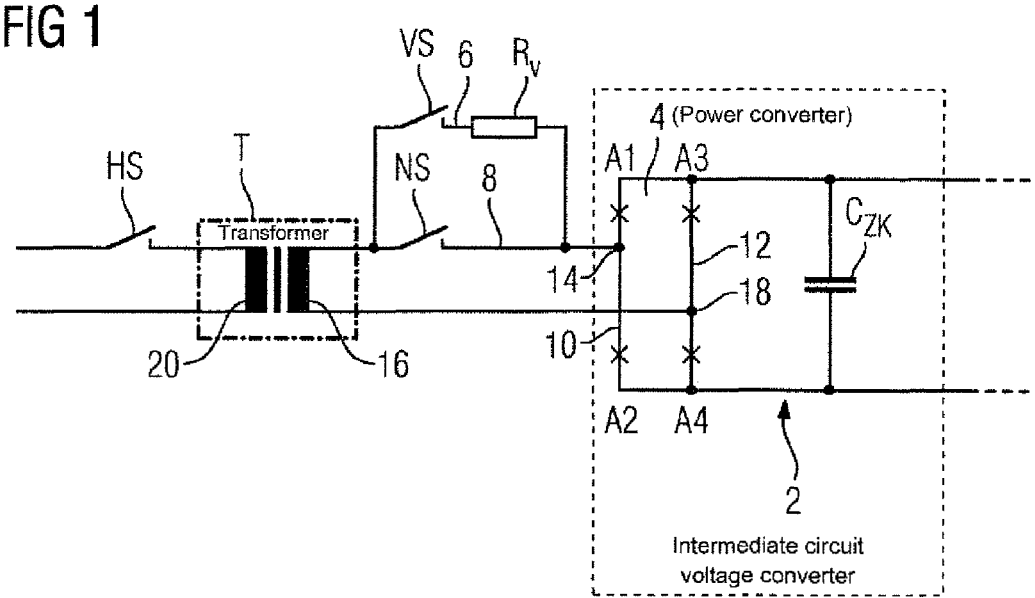

FIG. 1 shows only the intermediate voltage circuit with an intermediate circuit capacitor $C_{ZK}$ and a power converter 4 on the line side of an intermediate voltage circuit converter 2.

The load-side converter with a load connected thereto is not shown in any greater detail for reasons of clarity. The intermediate voltage circuit converter 2 is able to be connected by means of further components to a single-phase AC supply network. These additional components include a pre-charging circuit 6, a bridging circuit 8, a transformer T for potential separation and a main switch HS. Because of the connection of the intermediate voltage circuit converter 2 to a single-phase AC supply network the power converter 4 on the line side only has two bridging branches 10 and 12, which each feature two electrically-switchable power semiconductors A1, A2 and A3, A4 connected in series. A connection of a secondary winding 16 of the transformer T is connected by means of the bridging circuit 8 to the AC voltage-side connection 14 of the bridging branch 10. The second connection of this secondary winding 16 is linked directly to an AC voltage-side connection 18 of the bridging branch 12 of the power converter 4 on the line side. Connected electrically in parallel to the bridging circuit 8 is the pre-charging circuit 6. This pre-charging circuit 6 features a pre-charging contactor VS and a pre-charging resistor $R_V$. Pre-charging contactor VS and pre-charging resistor $R_V$ are connected electrically in series. The bridging circuit 8 has only one line contactor NS. The primary winding 20 of the transform T is able to be connected by means of a main switch HS to an AC supply network not shown in greater detail.

If this intermediate voltage circuit converter 2 is connected to a single-phase AC supply network the main switch HS and the pre-charging contactor VS will be closed. This connects a current path via which a charge current flows, which charges the intermediate circuit capacitor $C_{ZK}$. As soon as for example 80% of the maximum charge state of this intermediate circuit capacitor $C_{ZK}$ is reached, the line contactor NS is closed. This bridges the pre-charging circuit 6. The pre-charging contactor VS can subsequently be opened without power.

In the discharging of the intermediate circuit capacitor $C_{ZK}$ of the intermediate voltage circuit converter 2 the process is as follows:

Initially the intermediate voltage circuit converter 2 is disconnected from an AC voltage supply network in which the main switch HS is opened. Subsequently the line contactor NS is opened and the pre-charging contactor is closed. This means that the pre-charging resistor $R_V$ is connected together with the secondary winding 16 of the transformer T electrically in parallel with the AC voltage-side connections 14 and 18 of the power converter 4 on the line side. So that the pre-charging resistor $R_V$ is connected electrically in parallel to the intermediate circuit capacitor $C_{ZK}$ of the intermediate voltage circuit converter, only two of the four switchable power semiconductors of the power converter 4 on the line side have to be switched on. Either the switchable power semiconductors A1 and A4 or the switchable power semiconductors A2 and A3 are switched on. After the intermediate circuit capacitor $C_{ZK}$ is discharged, the pre-charging contactor VS is opened and the switched on switchable power semiconductors A1, A4 or A3, A2 are switched off again.

With this inventive method an intermediate circuit capacitor $C_{ZK}$ of an intermediate voltage circuit converter 2 can be discharged with the aid of the available pre-charging resistor $R_V$ without any further discharging contactor having to be provided.

Figure 2:
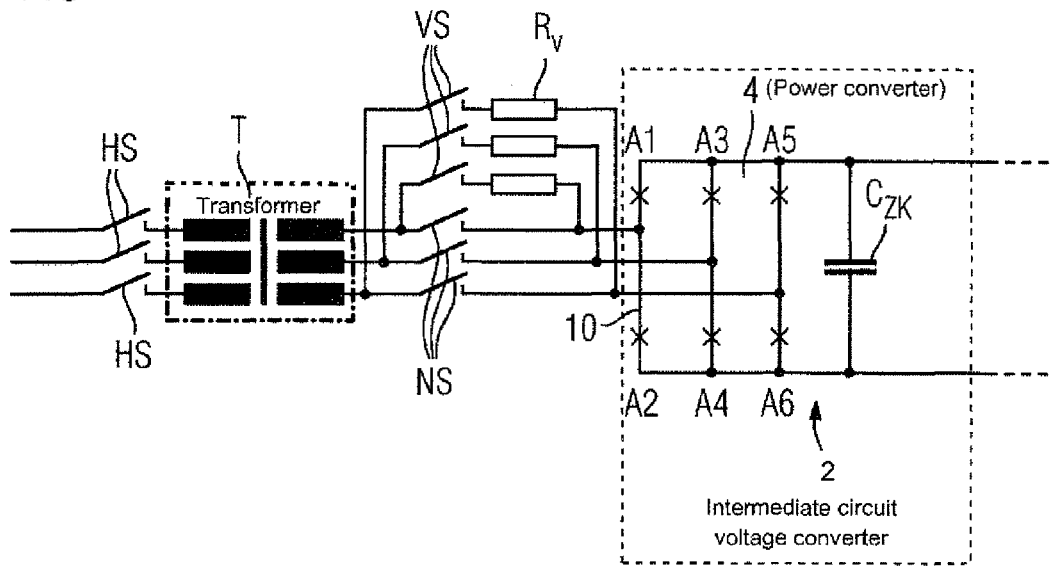
FIG. 2 shows a three-phase supply with transformer of an intermediate voltage circuit converter.

Shown in FIG. 2 is an intermediate voltage circuit converter 2 for the connection of a three-phase AC supply network not shown in any greater detail. This embodiment differs from the embodiment depicted in FIG. 1 in that the power converter 4 on the line side only has three bridging branches. An alternating current transformer is likewise provided as the transformer T. The main switch HS, the line contactor NS and the pre-charging contactor VS are each embodied as three-phase units. Instead of a pre-charging resistor $R_V$, three pre-charging resistors $R_V$ are used in the embodiment in accordance with FIG. 2. Despite the changed embodiment, nothing has changed in the method for charging the intermediate circuit capacitor $C_{ZK}$.

What is claimed is:

1. A method for discharging an intermediate circuit capacitor of an intermediate voltage circuit converter with an AC voltage-side electronic power converter having a plurality of switchable power semiconductors, the method comprising the steps of:
   opening a main switch arranged between an AC power supply network and a primary winding of a transformer,
   opening a line contactor connected between a first terminal of a secondary winding of the transformer and a first AC voltage-side connection in a first branch of the electronic power converter, with a second terminal of the secondary winding of the transformer being connected to a second AC voltage-side connection in a second branch of the electronic power converter,
   closing a pre-charging contactor, which is connected in series with a pre-charging resistor, with the series connection of the pre-charging contactor and the pre-charging resistor being connected in parallel with the line contactor, and
   switching on two switchable power semiconductors of the plurality of switchable power semiconductors, which are located diagonally opposite each other in different branches of the electronic power converter, thereby discharging the intermediate circuit capacitor via a current path formed by the pre-charging contactor, the secondary winding of the transformer and the two switchable power semiconductors.

2. The method of claim 1, further comprising the steps of:
   opening the pre-charging contactor when the intermediate circuit capacitor reaches a predetermined reduced charge state, and
   switching the two switched-on switchable power semiconductors off.

* * * * *